Figure 1:
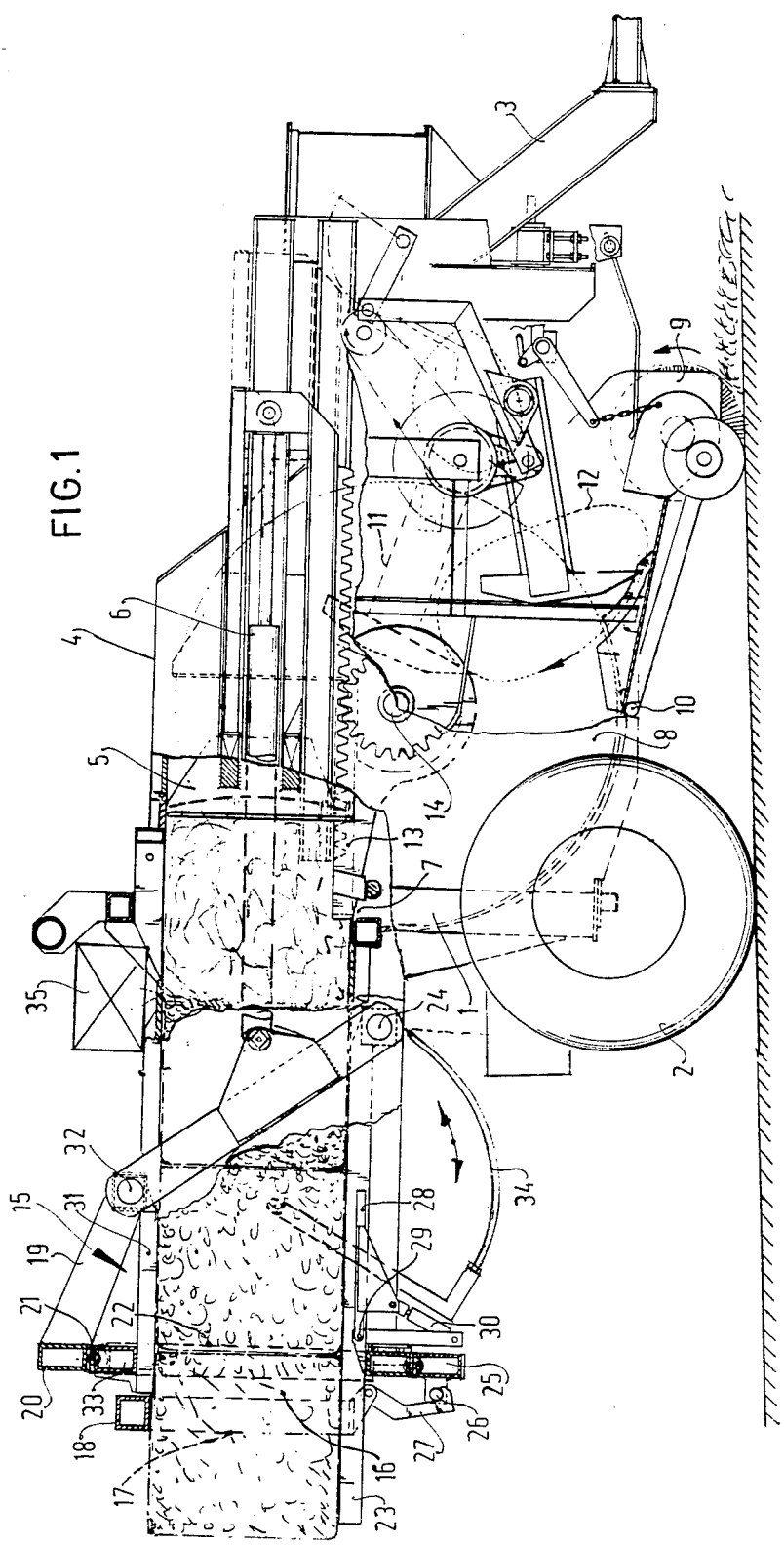

United States Patent [19]

Wondergem et al.

[11] Patent Number: 4,924,667
[45] Date of Patent: May 15, 1990

[54] BALER WITH SUCCESSIVELY POSITIONED REACTION MECHANISM

[75] Inventors: Jan Wondergem, Rijsenhout; Hermanus H. Vissers, Nieuw-Vennep, both of Netherlands

[73] Assignee: Multinorm B.V., Netherlands

[21] Appl. No.: 629,439

[22] Filed: Jul. 10, 1984

[30] Foreign Application Priority Data

Jul. 12, 1983 [NL] Netherlands .......................... 8302489

[51] Int. Cl.$^5$ .......................... A01D 15/08; B30B 1/00
[52] U.S. Cl. ........................................ 56/341; 100/192; 100/188 R
[58] Field of Search ................. 56/341, 343, 344, 250, 56/100, 188 R, 189, 142; 100/191, 192

[56] References Cited

U.S. PATENT DOCUMENTS

| | | | |
|---|---|---|---|
| 3,426,672 | 2/1969 | Nolt | 100/250 |
| 3,808,766 | 5/1974 | Hutchinson | 100/250 |
| 4,037,528 | 7/1977 | White et al. | 100/191 |
| 4,044,569 | 10/1977 | Harza | 100/192 |
| 4,401,022 | 8/1983 | Vissers | 100/250 |
| 4,464,889 | 8/1984 | Weelink | 56/341 |

FOREIGN PATENT DOCUMENTS

| | | | |
|---|---|---|---|
| 761436 | 12/1932 | France | 100/192 |
| 1029103 | 12/1950 | France | 100/192 |

Primary Examiner—John Weiss
Attorney, Agent, or Firm—Watson, Cole, Grindle & Watson

[57] ABSTRACT

A press for agricultural crop mainly comprising a frame (1), a baling chamber (4) with an inlet opening carried by said frame, a pressing member (5) driven so as to reciprocate in the baling chamber (4), said baling chamber (4) being provided with means for producing a counter-pressure in order to form a bale of compressed agricultural crop, wherein the means for producing the counter-pressure comprise an outlet part (15) prolonging the baling chamber (4) and narrowing in the pressing direction and a removable flap member (31) partly or wholly closing the passage near the transition area between baling chamber (4) and outlet part (15), in order to produce a counter-pressure at the start so that even the first or second bale has sufficient density.

10 Claims, 3 Drawing Sheets

BALER WITH SUCCESSIVELY POSITIONED REACTION MECHANISM

The invention relates to a press for agricultural crop mainly comprising a frame, a baling chamber with an inlet opening carried by said frame, a pressing member driven so as to reciprocate in the baling chamber, said baling chamber being provided with means for producing a counter-pressure in order to form a bale of compressed agricultural crop.

Presses of the kind set forth in the preamble are known in many embodiments. A known embodiment, the so-called channel press, for example forms a bale at a previously formed bale. The previously formed bale serves as a counter-element for producing the desired pressure. This type of press involves the problem that initially there is no bale capable of producing a sufficient counter-pressure. This is the more troublesome the higher becomes the nominal pressure. It may even last for five formed bales before the desired working pressure is reached. These initial bales are not suitable for the desired consecutive treatments.

A different type of pressure is formed by the closed press in which a rear wall is used against which the agricultural crop is compressed. In this case a high pressure can be attained already from the beginning so no loss occurs at the start. A disadvantage of this type of press, however, is that at the end of a pressing cycle the remainder is usually not sufficient to form a complete bale formed under high pressure. It is common practice to leave the remainder in the baling chamber for use during the next pressing cycle. The interval of time between the two cycles may be so long that the material in the baling chamber deteriorates to an extent such that it is no longer acceptable in wage services.

The invention has for its object to improve a device of the kind set forth in a manner such that the aforesaid drawbacks will no longer occur.

The device embodying the invention is distinguished in that the means for producing the counter-pressure comprise an outlet part prolonging the baling chamber and narrowing in the pressing direction and a removable flap member partly or wholly closing the passage between the baling chamber and the outlet part.

Thanks to the flap member it is now possible to produce a counter-pressure at the start so that even the first or second bale has sufficient density. After the formation of the first bale the flap member can be removed so that the first bale can then operate as a counter-pressure member in the narrowing outlet part of the press. The last amount of crop can be compressed by the desired high pressure and be removed from the baling chamber.

In a preferred embodiment the flap member is pivotable about a shaft directed transversely of the direction of compression so that after the formation of the first bale the flap member need only be turned away to release the passage. According to a further aspect of the invention it is then advantageous to arrange a lock bolt for the flap member on the boundary of the outlet part located opposite said shaft, by which bolt the instant at which the member is to be turned away can be accurately fixed.

In a particularly advantageous embodiment the flap member constitutes in the passage-releasing position in addition the boundary of the outlet part so that the construction is appreciably simplified.

In a further development of the invention the bottom boundary of the outlet part is pivotally connected with the baling chamber so that at the end of the pressing cycle the bales last formed can be removed in a simple manner.

In accordance with a still further simplification of the device the flap member can be arranged opposite the bottom boundary in the top side of the prolonged outlet part so that the two boundary walls constitute the narrowing passage of the outlet part.

For using the device on the field the frame is provided with supporting wheels, whilst the frame is furthermore provided with pick-up means for picking up the crop from the field and feeding it into the baling chamber.

If required a collecting space for temporarily storing the picked-up crop may be arranged between the pick-up means and the inlet port of the baling chamber.

In order to obtain the desired high pressures it is preferred to carry out by hydraulic agency the drive of the pressing member, the actuation of the flap member and the drive of the bottom boundary of the prolonged outlet part.

The above-mentioned and further features of the invention will become apparent from the following description of the Figures showing an embodiment.

The drawing shows in

Figure 2:
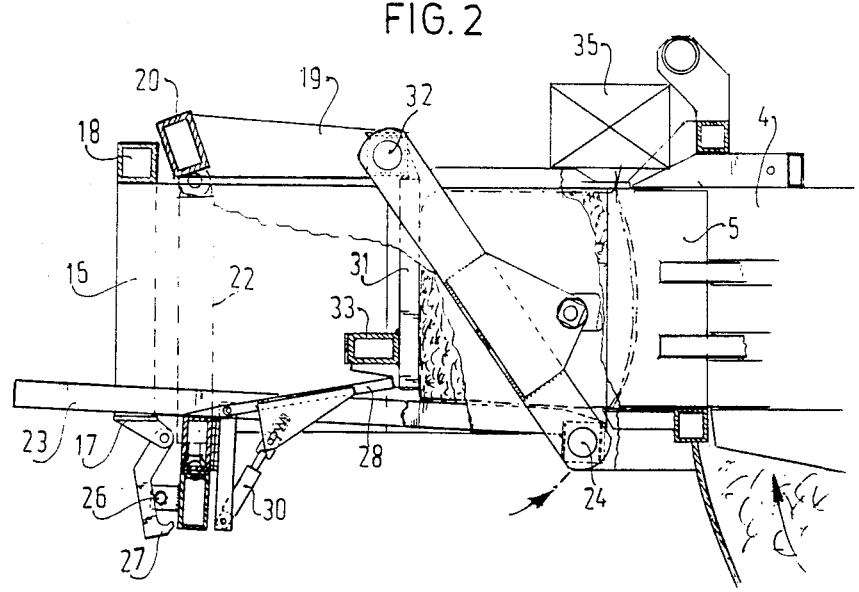
Figure 3:
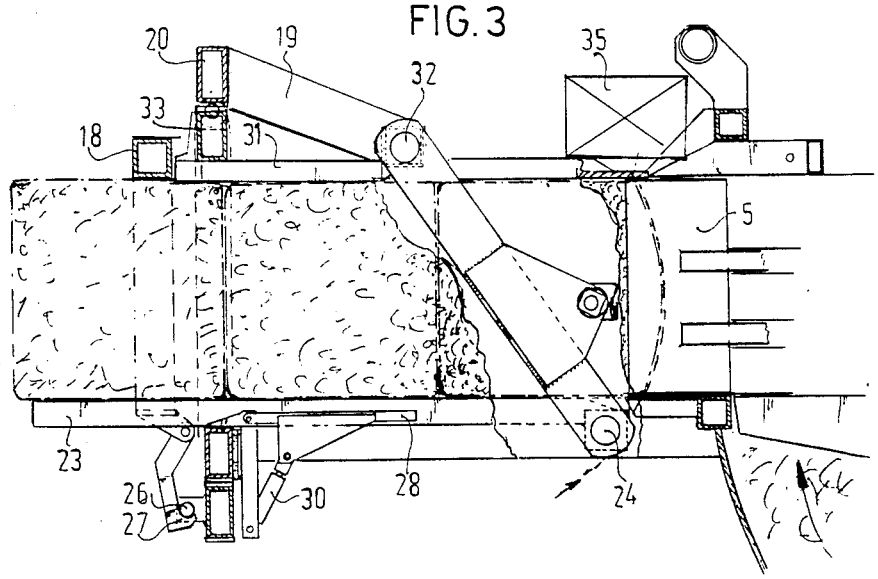
Figure 4:
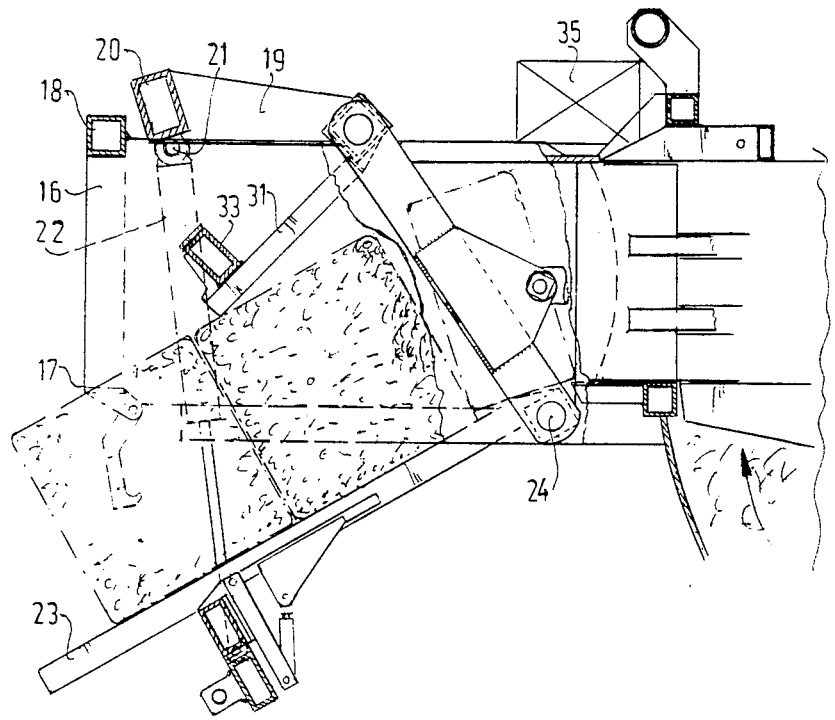

FIG. 1 a vertical sectional view of a mobile press for agricultural crop embodying the invention, FIGS. 2, 3 and 4 each a vertical sectional view of the outlet part of the press of FIG. 1 in different working positions.

The agricultural press shown in FIG. 1 mainly comprises a frame 1 supported by ground wheels 2 and provided at the front with a coupling tree 3 for attachment to an agricultural tractor or the like. On the top side the frame has a baling chamber 4, in which a pressing member formed by a plunger 5 can reciprocate. The plunger is driven by means of two hydraulic rams 6 arranged one on each side of the baling chamber 4. The baling chamber has an inlet port 7 on the bottom side. Below the baling chamber is suspended a collecting space or auxiliary chamber 8 for temporarily storing crop picked up from the field. The crop is picked up from the field by a pick-up device 9, which is pivotally fastened at 10 to the bottom edge of the auxiliary chamber 8. Behind the pick-up device 9 and in front of the beginning of the auxiliary chamber 8 pushing members 11 are rotatably journalled in the frame and movable along a substantially oval path 12.

In the auxiliary chamber 8 a flap 13 is rotatable about a shaft 14 through 360° in a manner such that the flap transfers the crop collected in the auxiliary chamber 8 through the inlet port 7 to the baling chamber 4. The flap 13 serves, in addition, for temporarily closing the inlet port 7.

The press described above serves in particular to form high-density bales of agricultural crop, which type of press has been described earlier in, for example, Dutch Patent Application 7807779. The mode of operation of this press is supposed to be known and lies beyond the scope of the invention.

According to the invention the press is now equipped with an outlet part generally designated by reference numeral 15. The outlet part is in line with the baling chamber 4 and comprises two fixed, vertical sidewalls 16 aligned to those of the baling chamber 4. At the end the sidewalls 16 are reinforced by a vertical profile beam 17, said beams being interconnected at the top ends by a horizontal portal beam 18.

A second portal beam 20, adapted to move freely up and down, is fastened to two or more pivotal arms 19, which can pivot up and down about a transverse shaft 32. At the other end of the second portal beam 20 cylinders 22 extending along the outer side of the sidewalls 16 are pivotally coupled at 21. The piston rod is pivotally coupled with the lower boundary 23 of the prolonged outlet part. The lower boundary 23 is rotatable about a pivotal shaft 24 directed transversely to the direction of compression and coupled with the baling chamber 4.

Near the pivotal joint with the piston rod of the cylinder 22 the lower boundary 23 is reinforced by a profile beam 25. This profile beam 25 is provided on the rear side with a locking pin 26, around which a lock bolt 27 can be hooked. The lock bolt 27 is pivotally fastened to the lower end of the vertical profile beam 17.

The lower boundary is furthermore provided with a second lock bolt formed by a locking bar 28, which is pivotally fastened at 29 to the profile beam 25. The locking bar 28 can be moved up and down by means of a hydraulic ram 30 across the lower boundary 23 in order to lock a flap member to be described more fully hereinafter.

The top boundary 31 of the prolonged outlet part 15 is formed in this case by a wall part which is pivotally connected at the transverse shaft 32 with the baling chamber 4. This wall part 31 can be turned downwards to an extent such that it can shut the passage at the transitional area between the baling chamber 4 and the outlet part 15. The edge of the flap member 31 remote from the pivotal shaft 32 is reinforced by a profile beam 33.

The operation of the device described above is set out in detail with reference to FIGS. 2, 3 and 4.

Starting from the position shown in FIG. 2 the flap member 31 is in a vertical position in which it is blocked by means of the locking bar 28, which is lifted from the lower bondary 23 with the aid of the cylinder 30. By feeding crop into the baling chamber 4 and by moving the pressing member 5 to the left an amount of crop can be compressed between the flap member 31 and the pressing member 5. This may occur in one or more pressing runs. The resultant bale can be tied up by means of any tying apparatus formed in this case by a plurality of curved needles 34 adapted to pass through channels in the front side of the pressing number 5 for typing a binder, for example, twine around the bale by means of a knotting device 35. The typing/knotting device 34, 35 may be of an arbitrary design and lies beyond the scope of this invention.

After the first bale has been formed the locking bar 28 can be moved downwards by means of an inverse energization of the cylinder 30 until it is in the position shown in FIG. 3. By subsequently pressing further crop against the first bale the flap member 31 is turned in clockwise direction about the pivotal shaft 32 in upward direction until the the reinforcing profile beam 33 butts against the portal beam 20.

The lower boundary member 23 is initially in the position shown in FIG. 2, in which it is slightly lifted by the cylinders 22. Together with the flap member 31 in an intermediate position said boundary narrows the passage of the outlet part, whilst adequate counter-pressure is produced for obtaining the high pressure required for the subsequent bales. When the bales advance further the bottom boundary 23 is presed down and the end position is reached when the lock bolt 26 snaps into the hook 27, after which the flap member 31 is pressed further upwards whilst taking along the profile beam 20.

The pressing cycle can continue until the agricultural crop is worked up and a residue is left in the baling chamber 4. This residue is compressed in the conventional manner by the high pressure and can finally be tied up in a small package. This final package, though smaller, yet has the same density as the preceding bales.

For emptying the outlet part the user can turn the locking hooks 27 in clockwise direction so that the lock bolt 126 is released. Then the bottom boundary can turn downwards about the shaft 24 in anticlockwise direction, which can be furthered or braked respectively by the cylinders 22. The counter-pressure of the outlet part is thus eliminated so that the remaining bales can be readily removed along the sloping lower boundary.

By inverting the energization of the cylinders 22 the lower boundary 23 can be returned to the position shown in FIG. 2, in which the upper boundary formed by the flap member 31, which is freely rotatable about the shaft 32, is again moved into the vertical position and locked by means of the locking bar 28.

Then the pressing cycle can be repeated.

The invention is not limited to the embodiment described above. For example, the flap member 31 may be designed in a manner differing from that shown, it being in particular conceivable to cause the member to turn about a vertical shaft so that the flap member can form part of the sidewall of the outlet part. It is furthermore possible to draw the flap member out of the baling chamber transversely of the direction of compression for releasing the passage. The flap member 31 may furthermore be formed by two or more movable parts.

What is claimed is:

1. In an agricultural baling machine, the combination of a frame having a generally horizontally disposed baling chamber having an inlet for receiving a crop and an outlet end, means for loading crop into the baling chamber through the inlet, ram means within the baling chamber for advancing crop loaded within the baling chamber toward said outlet end thereof, reaction/guiding means for movement from a first position at said outlet end of the baling chamber extending across said outlet end in at least partially blocking relation thereto to form a reaction surface against which a bale being formed by said ram means is urged during formation of a first bale and for movement to a second position beyond said outlet end of said outlet end of the baling chamber forming a narrowing extension beyond said outlet end of the baling chamber to resist movement of said first bale out of said baling chamber so that it forms a reaction surface against which a second bale is urged by said ram means during formation of said second bale, and stop means against which said reaction/guiding means abuts when in said second position.

2. In a baling machine as defined in claim 1 wherein said reaction/guiding means comprises a flap member swingable from a position extending transverse of said outlet end of the baling chamber to a position forming an extension of a top wall of the baling chamber.

3. In a baling machine as defined in claim 2 wherein said flap member is freely swingable downwardly by gravity to said position extending transverse of said outlet end of the baling chamber.

4. In an agricultural baling machine, the combination of a frame having a generally horizontally disposed baling chamber having an inlet for receiving a crop and an outlet end, means for loading crop into the baling chamber through the inlet, ram means within the baling chamber for advancing crop loaded within the baling chambr toward said outlet end thereof, and reaction/guiding means forming an extension of said baling chamber at the outlet end thereof for movement from a first position at least partially blocking said outlet end of the baling chamber during formation of a first bale to a second position forming a narrowing extension of the baling chamber during formation of a second bale, said reaction/guiding means comprises a flap member swingable from a position extending transverse of said outlet end of the baling chamber to a position forming an extension of a top wall of the baling chamber, said reaction/guiding means also comprising a bottom member pivoted to the baling chamber and swingable between a position forming an extension of a bottom wall of the baling chamber and a position slightly inclined upwardly with respect to such bottom wall.

5. In a baling machine as defined in claim 4 including power means for forcing said bottom member to its inclined position while limiting swinging movement of said flap member to a slightly downwardly inclined position relative to said top wall of the baling chamber.

6. In a baling machine as defined in claim 5 including releasable latching means carried by said bottom emmber for latching said flap member in said position extending transverse of said outlet end of the baling chamber.

7. In a baling machine as defined in claim 5 wherein said power means permits forcible swinging separation of said flap member and said bottom member from their inclined positions to substantially parallel positions, and including second latching means for releasably holding said bottom member in a substantially horizontal position forming a substantially planar extension of said bottom wall of the baling chamber.

8. In a baling machine as defined in claim 7 wherein said second latching means is releasable to permit said bottom member to swing downwardly and form a downwardly inclined discharge chute for bales resting thereon while said flap member swings by gravity to its position extending transverse of said outlet end of the baling chamber.

9. In a baling machine, the combination of a wheel-supported frame having a generally horizontally disposed baling chamber provided with a crop inlet and a bale outlet end, means for loading crop into the baling chamber and ram means for periodically forcing crop loaded into the baling chamber toward said bale outlet end of the baling chamber, extension means forming wall portions at said outlet end of the baling chamber for movement between a position providing converging surfaces extending from and beyond said bale outlet end of the chamber and a discharge position providing a discharge chute for discharging bales, power means for moving said wall portions between said position providing the converging surfaces to resist expulsion of a bale from said bale outlet end of the baling chamber, thereby providing counter-pressure against which crop is pressed by said ram means, and said discharge position, one of said wall portions being swingable to a position at least in partially blocking relation to said outlet end of the baling chamber during the formation of a first bale.

10. In a baling machine of the type having a generally horizontally disposed baling chamber provided with means for receiving crop and having an open discharge end through which bales are expelled, means for feeding crop into the interior of the baling chamber and ram means for periodically forcing crop fed into the baling chamber toward said open discharge end, swingable means at said discharge end of the baling chamber for providing, in one position thereof relative to said open discharge end, counter-pressure at said discharge end againt which crop is compressed by said ram means, for providing, in another position thereof different fromm said one position relative to said open discharge end, counterpresure beyond said discharge end of the baling chamber to resist expulsion of a first bale from said discharge end so that crop in the process of being formed in a second bale is compresed against such first bale and for providing, in a still further position different from either said one or said another positions, a discharge chute for the first bale, and stop means against which said swingable means abuts when in said another position, said stop means being movable to enable said swingable means to move to said still further position.

* * * * *